Patented Mar. 2, 1948

2,437,150

UNITED STATES PATENT OFFICE 2,437,150

COMPRESSED CEREAL

Isadore A. Berg, Cincinnati, Ohio

No Drawing. Application September 16, 1944,
Serial No. 554,543

8 Claims. (Cl. 99—83)

This invention relates to the compression of foods. It is directed particularly to the preparation of compressed cereals and other foods adapted to be merchandised in the form of cubes, cakes or blocks appropriately wrapped and ready to be crushed or disintegrated for use, or eaten as such.

The principal objective of this invention has been to provide self-sustaining unitary food masses which are sufficiently firm to withstand the handling that is incidental to the wrapping and packaging of the product yet also sufficiently friable to be broken down easily and conveniently for use; that is, crushed easily through the pressure of fingers or with a suitable utensil such as a spoon, so as to be free from lumps or caked masses.

The foods adapted to be compressed in accordance with this invention may be individual foods in the form of granules, powder or flakes such as rolled oats, puffed wheat, rice, farina, skim milk or the like, or the foods may be of the so-called "premixed" type containing, for instance, nonfat milk solids, shortening, sugar, salt and other ingredients. In the case of premixed cereals the shortening, sugar and salt usually constitute somewhat less than 50% of the composition while the basic components are wheat, rice, corn, oats, etc., usually treated with malt and sugar to improve their palatability.

Foods of these types either dehydrated or naturally dry are of an impalpable nature and do not compress satisfactorily in and of themselves. The problem, for instance, is appreciated most readily in the case of rolled oats which, even though subjected to extremely high pressure, fall apart as they are taken from the compression cavity, especially if the compressed units are in the form of discs. The presence of fat and other components is of some assistance in improving stability of the cake form but causes difficulty in the separation of the compressed mass from the die through sticking, and even so does not enable the production of a unitary mass which is both firm and friable.

I have discovered, briefly, that both the desired firmness and the desired friability of compressed cereal and other food masses may be obtained by incorporation, prior to compressing, of a small quantity of glycerine or its equivalent. Not more than about one-half to about three percent by weight is required to obtain the desired results, the amount usually employed being approximately 1%. This small quantity of glycerine in each instance has a remarkably pronounced effect upon the ability of the food particles to adhere to one another and yet be separated when being prepared for use. The quantity is so small that no physiological problem is encountered through the addition, and the effect is equally pronounced whether the food be in the form of a cereal, a premixed composition, a powder such as skim milk or chocolate beverage or the like.

In a copending patent application, Serial No. 492,417, filed June 26, 1943, and now abandoned, I have disclosed the use of small quantities of sugary syrups as an aid in the solution of the problems to which the present invention is addressed. These syrups operate suitably with a wide variety of food products such as impalpable skim milk powder and the like. In the case of certain other foods, however, the presence of a sugary syrup may have the tendency of causing the compressed masses to leave adherent films upon the compression dies which requires that the dies be cleaned at periodic intervals. The incorporation of glycerine as distinguished from an equally small amount of a sugary syrup does not involve these difficulties; compression takes place rapidly and conveniently, and the compressed masses are stripped readily from the dies without sticking, and the addition component is incorporated into the food product to be compressed with equal ease and convenience.

Glycerine has been disclosed herein as a desirable addition agent for the purpose but it is not the only substance adapted to be used for the effect. Propylene glycol, ethylene glycol and other glycols may be used for the same purpose to equal advantage. All are physiologically inert particularly in the small quantities in which they are employed. It may be noted that more of the addition agent than the amount just given may be incorporated without adverse effect but also without substantial improvement in results. The upper limits which have been disclosed herein, therefore, are limits beyond which it is not either necessary or particularly desirable to exceed, for commercial reasons rather than because of function.

While glycerine or the glycols used in accordance with this invention produce some of the effects of a typical gum type binding agent they have none of the stickiness which is characteristic of the usual binders and an explanation for their pronounced behavior cannot be advanced upon this basis. It is believed that the desired action is brought about by virtue of their effect upon the moisture which is present in the food. Whether the addition agent used in accordance herewith be glycerine, propylene glycol, ethylene glycol, or the like, the U. S. P. grade preferably is employed which contains not more than five percent of water. The addition agent in and of itself, in other words, is anhydrous or substantially so and an amount of water which might have bearing upon compressibility is not introduced through this source. The foods, themselves, especially if dehydrated, usually are made as dry as possible but always contain some moisture which may be as much as two to eight percent, depending upon the process through which the food was manufactured or dried, and upon the presence of "premixed" ingredients in it. It is believed that the hygroscopic nature of the addition agent causes the moisture which, initially, is present in the food in uniform distribution, to be collected at the surface of the food particles where the addition agent is present and thereby the surfaces of the food particles are rendered sufficiently "tacky" for them to adhere to one another upon compression. This explanation is confirmed in part by the fact that improved compressibility of an ordinary uncompressible food, such as rolled oats, can be obtained if water is mixed with it in small quantity. The fact is, however, that the addition of water per se is a very undesirable practice because it impairs the keeping qualities of the food and adds needlessly to the weight of the compressed mass. Upon the basis of this explanation the addition agent functions to effect a re-distribution of the moisture naturally present. It is to be understood, however, that this explanation is a purely empirical one and this specification is not intended to be limited thereto.

The following examples illustrate the practice of the invention in the compression of a variety of types of foods. A typical compressed unit weighing approximately 2 ounces may be in the form of a disc substantially 2⅛" in diameter by ⅝" thick, the actual weight depending upon the nature of the composition compressed and the degree of compression. Compressed units may, of course, be of larger size and in the form of blocks or cubes as desired.

*Example I.—Whole wheat type farina*

To 100 parts by weight of whole wheat farina is added 1 part by weight of C. P. glycerine. The incorporation is conducted by pouring the glycerine slowly into the farina while the farina is being mixed in a mixing machine. The glycerine may be sprayed while the food is being agitated. The action of the glycerine is very rapid and within about one minute more or less after incorporation the farina is ready to be compressed. It may now be introduced into die cavities and subjected to compression, the total pressure depending upon the firmness which is desired in the final cake. After compression the unitary masses or blocks are stripped from the die cavities and ready for packaging. They are firm and may be packed tightly in a Cellophane wrapper without disintegration. Moreover, the pressure incidental to the sealing of the wrapper may be exerted upon the mass without crushing it. On the other hand, the compressed product is of a friable nature and may be disintegrated by pressing upon it with a utensil or by crumbling it with the fingers, and after disintegration the mixture is free from lumps or undisintegrated agglomerations.

Processed farina is handled in the same manner as the whole wheat type.

*Example II.—Cracker meal*

Cracker meal may be compressed, following the procedure of Example I, except that in this case it is desirable to add approximately 2 parts by weight of glycerine.

2 parts by weight of glycerine also is used in the compression of rolled oats.

*Example III.—Premixed cereals*

Premixed cereals may include a variety of ingredients, for instance, ground puffed wheat, wheat flakes, ground grape nuts, corn flakes and the like, which usually constitute at least 50% of the total composition. Non fat milk solids may be used in amounts from approximately 10% to 25%; sugar to the amount of 10% to 15%; shortening approximately 10% and small percentages of salt or other flavoring. In the compression of these premixed compositions glycerine is added to the extent of 1 to 2% by weight, the exact quantity depending to a degree upon the particular composition which is being compressed. The procedure is as in Example I.

It is to be noted that the rapid action of the glycerine in effecting re-distribution of the moisture is desirable in that the mixing need not be prolonged. This has the effect of preserving particle size and no continued mixing is necessary which would tend to break down the particles of larger sizes such as corn or wheat flakes.

*Example IV.—Compression of skim milk powder*

Skim milk powder is compressed by adding to it in the form of a stream or by spraying approximately ½% of glycerine after which the product is ready to be compressed.

*Example V.—Compression of chocolate beverage*

A chocolate beverage ready to be added to milk or water or eaten as such may be prepared in the form of a friable self-sustaining mass by incorporating about 1% of glycerine therewith. The beverage product may contain, for instance, approximately 50% of sugar, skim milk solids about 30%, cocoa about 20% and lecithin or other emulsifier sufficient to stabilize the solids when liquid is admixed with them.

The addition of glycerine to a mix of this sort, upon compression, gives a cake which is sufficiently hard and firm to be eaten like candy.

*Example VI.—Compression of soup mix*

A type of soup mix to which water may be added to prepare soup comprises precooked pea flour about 50%, low fat soya flour about 25%, non-fat milk powder about 10% and salt flavorings, etc., about 15%. To this mixture 3 parts by weight of glycerine may be added and admixed as in Example I. The composition upon compression yields a firm and stable cake which may be crushed easily between the fingers and which also may be wrapped without disintegration or powdering away of the flour ingredient.

Some of the compositions, for instance, rolled oats, as disclosed in the foregoing examples, have the characteristic of disintegrating in and of themselves when water is added to them for preparation of the foods. In such instances therefore the self-sustaining masses are of a self-disintegrating nature. In all other cases the reduction of the compressed mass is accomplished easily by pressing upon it with a utensil.

*Example VII.—Compression of potato meal*

Potato meal is a free-flowing material and does not lend itself readily to commercial compression. However, the addition of 1% of glycerine has a pronounced effect upon the meal and renders it compressible to a firm body shape which is self-sustaining. After the glycerine has been added to the meal it has a somewhat wet appearance illustrating the effect of the glycerine in re-distributing the moisture present.

In all of the foregoing examples compression has been disclosed with the use of glycerine. In each instance, however, propylene glycol and ethylene glycol may be used to equal advantage.

In the commercial practice of the invention the use of glycerine or the glycols is desirable in that less force upon the food product is required to obtain a character of a given degree of firmness. This is of particular advantage in the case of flaked or puffed types of cereals because it causes less breakage of the cereal pieces and thereby adds to their palatability.

Having described my invention, I claim:

1. A method of producing a unitary self-sustaining compressed cereal food which is both sufficiently firm to withstand handling and packing and sufficiently friable to be crumbled in preparation for use, the said method comprising adding to said cereal composition prior to compression thereof a small quantity of a material selected from the group consisting of glycerine, and propylene glycol as a binder to hold the particles of cereal together following compression, and then compressing said mass.

2. A method of producing a unitary self-sustaining compressed cereal food which is both sufficiently firm to withstand handling and packing and sufficiently friable to be crumbled in preparation for use, the said method comprising adding to said cereal composition prior to compression thereof a small quantity of propylene glycol which is sufficient in amount to bind together the particles of cereal in said composition after compression, and then compressing said composition.

3. As a new article of manufacture, a substantially dry cereal food product which is in the form of particles united one to another as a self-sustaining firm and compact mass which is also sufficiently friable to crumble easily in preparation for use, the said mass containing from approximately 1 to 4% of a material selected from the group consisting of glycerine, and propylene glycol which is present in said mass as an agent promoting and sustaining the firmness thereof.

4. As a new food product, rolled oats in the form of a unitary self-sustaining mass containing approximately 1 to 4% of a material selected from the group consisting of glycerine, and propylene glycol as an agent effective for producing firmness and compressibility of said rolled oats.

5. A premixed cereal composition consisting essentially of cereal, nonfat milk solids, salt, shortening and a small percentage of glycerine, the percentage of glycerine being effective to enable said premixed cereal composition to be compressed into a self-sustaining mass which is sufficiently firm to withstand compression and also sufficiently friable to be disintegrated in preparation for use.

6. The method of producing physically stable, self-sustaining, but friable, compressed substantially dry cereal food product, in which the particles do not, unassisted, stably adhere to one another after compression, which method comprises incorporating, as a binder to promote adhesion of the particles, substantially 1 to 4% by weight of glycerine, prior to compression, and then compressing said particles together.

7. The method of producing physically stable, self-sustaining, but friable, compressed units of substantially dry cereal composition, in which the particles do not, unassisted, stably adhere to one another after compression, said method comprising incorporating, as a binder to promote adhesion of the particles to one another, a small quantity of a material selected from the class consisting of glycerine, and propylene glycol, then compressing the cereal composition.

8. A substantially dry premixed cereal composition in the form of a self-sustaining but friable compressed mass, the said composition being characterized in that it is incapable, of itself, of sustaining unitary compressed form, but the said compressed mass also being characterized by the presence of a small quantity of glycerine which is effective in conferring self-sustaining properties upon the compressed mass.

ISADORE A. BERG.

REFERENCES CITED

The following references are of record in the file of this patent:

UNITED STATES PATENTS

| Number | Name | Date |
|---|---|---|
| 48,697 | Larcher | July 11, 1865 |
| 713,581 | Winton | Nov. 11, 1902 |
| 1,639,549 | Bellamy | Aug. 16, 1927 |
| 1,737,365 | Epstein | Nov. 26, 1929 |
| 2,026,034 | Griffith | Dec. 31, 1935 |

FOREIGN PATENTS

| Number | Country | Date |
|---|---|---|
| 5,132 | Great Britain | 1878 |
| 20,494 | Great Britain | 1889 |
| 22,177 | Great Britain | 1908 |

OTHER REFERENCES

Gregory, Uses and Applications of Chemicals and Related Materials, Reinhold Publishing Co. Corp., pp. 275, 301.